Dec. 6, 1949   G. A. NEWELL   2,490,538
CHICKEN HOUSE MANURE CONVEYER
Filed Dec. 22, 1948   2 Sheets-Sheet 1
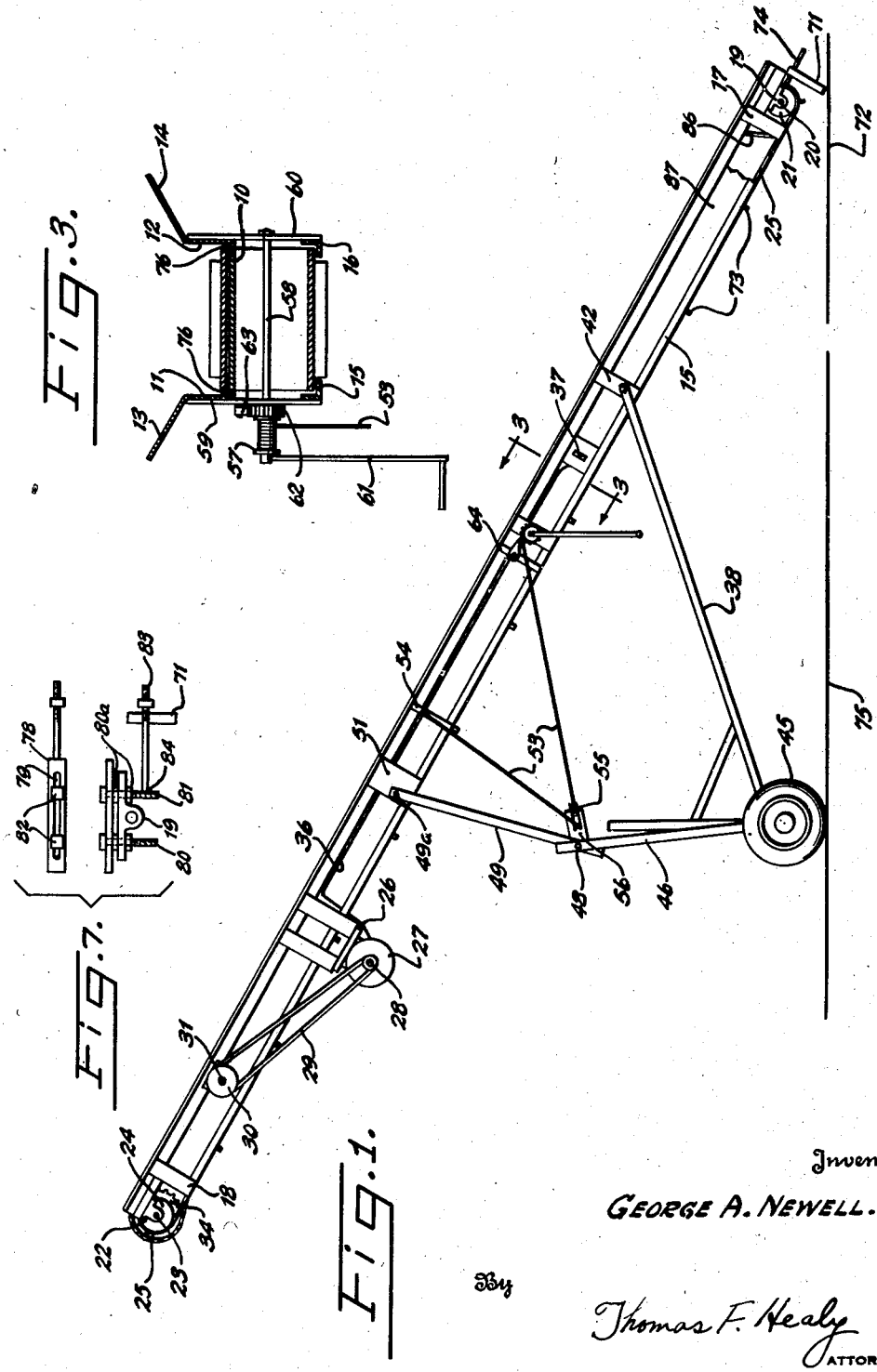
Inventor
GEORGE A. NEWELL.
By
Thomas F. Healy
ATTORNEY

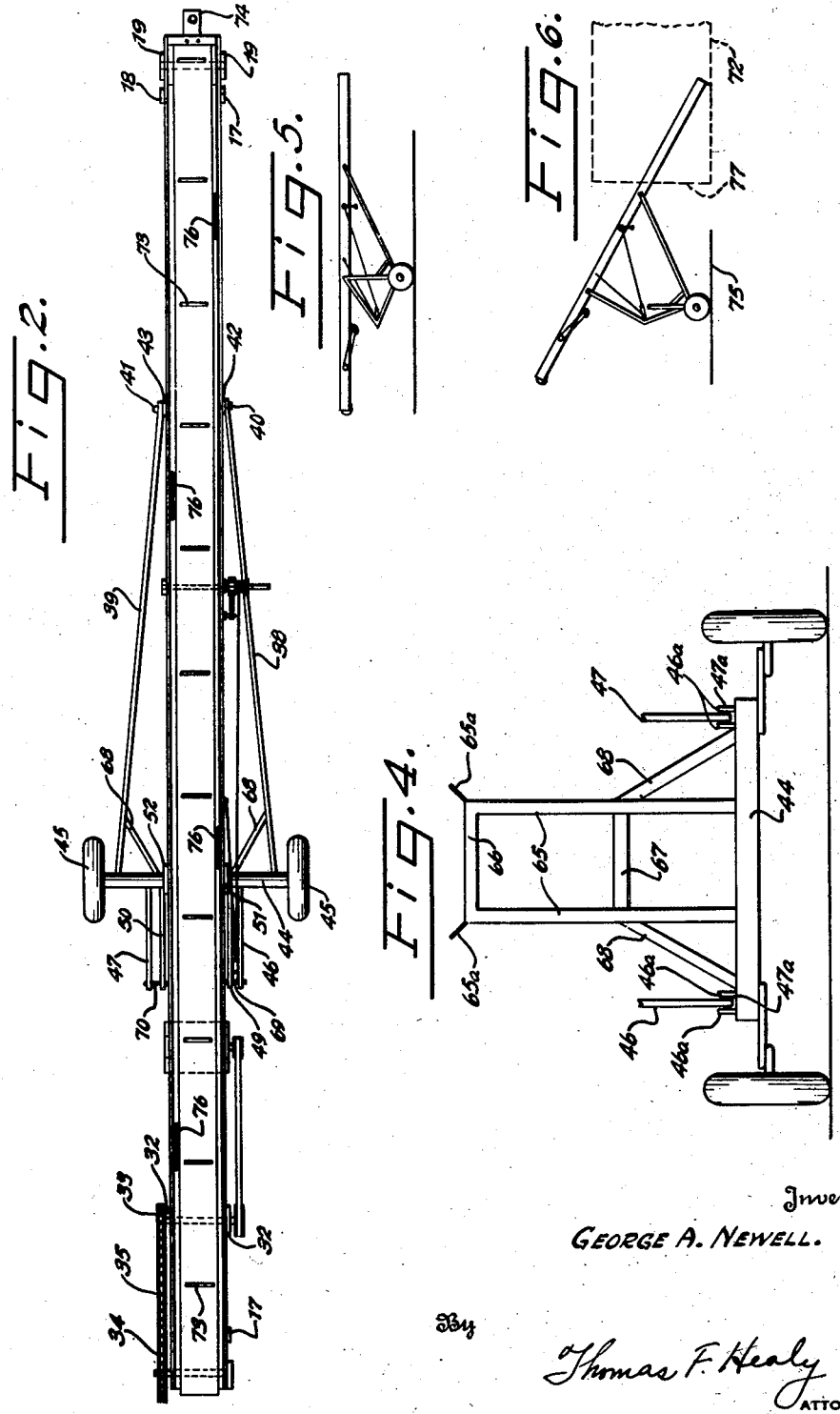

Patented Dec. 6, 1949

2,490,538

UNITED STATES PATENT OFFICE 2,490,538

CHICKEN HOUSE MANURE CONVEYER

George A. Newell, Hurlock, Md.

Application December 22, 1948, Serial No. 66,655

4 Claims. (Cl. 198—233)

The present invention relates to improvements in chicken house manure conveyors and has for an object the provision of a device of this kind for removing manure from chicken houses.

Another object of the present invention is to provide an improved adjustable conveyor, a portion of which can be introduced into a chicken house so that the height of the introduced end of the conveyor can be regulated to make it accessible to the operator for shoveling the manure thereon.

A further object of the present invention is to provide an improved structure which is sufficiently narrow to permit of being readily introduced through the door of a chicken house.

A still further object of the present invention is to provide an improved conveyor of this type which admits of quick and facile adjustment from an operative position to an inoperative position in which latter position it is ready for transportation from one location to another.

The present invention aims to provide an improved conveyor which is light in weight so that it can be operated and moved from place to place by one attendant, is very sturdy in construction, the manufacturing and operating costs of which are economical and has relatively few operating parts.

The present invention also aims to provide an improved device of this kind which is adapted not only to carry chicken manure, but also to carry coal, sand, dirt and the like.

With the foregoing and other objects in view, the invention will be hereinafter more fully described and more particularly pointed out in the appended claims.

In the drawings, in which the same parts are denoted by the same reference numerals throughout the several views:

Figure 1 is a side elevational view of the improved device in operative position;

Figure 2 is a top plan view of the same;

Figure 3 is a transverse vertical sectional view on the line 3—3 of Figure 1;

Figure 4 is a front elevational view of the supporting structure for the conveyor with parts broken away;

Figure 5 is a side elevational view of the improved device in position to be transported;

Figure 6 is a side elevational view of the improved device with its forward end portion introduced into a chicken house shown in dotted lines; and Figure 7 is a detail view of the belt tightening means.

Referring more particularly to the drawings and especially Figure 3, the improved device is shown as having a trough comprising a horizontally disposed bottom 10, side walls 11 and 12 extending upwardly from the opposite side edges of the bottom 10 and wings 13 and 14 extending from the upper free edges of the side walls 11 and 12, respectively, at an angle of the order of forty-five degrees. The trough can be made from two pieces of metal of the desired length and each pressed into the shape described and then welded together. Disposed beneath the trough and in spaced relation thereto are a pair of guide rails 15 and 16 of angle iron formation in cross section, as illustrated in Figure 3.

The guide rails 15 and 16 are maintained in their spaced apart relation to the trough by straps 17 and 18 which are secured by welding or the like to the vertical flange of the guide rail 15 and the side wall 11 of the trough and the vertical flange of the guide rail 16 and the side wall 12, respectively. Bearings 19 which can be of the pillow block type are mounted on the forward end portions of the side walls 11 and 12 of the trough and support an axle 20 on which is rotatably mounted a drum 21. On the rear end portions of the side walls 11 and 12 of the trough there are mounted bearings 22 which are similar in construction to the bearings 19. A shaft 23 is rotatably mounted in the bearings 22 and a drum 24 is keyed to the shaft 23. An endless conveyor belt 25 which can be made of rubber or any other suitable material is trained about the drums 21 and 24.

A bracket 26 is secured as by welding or the like to the side wall 11 of the trough and the guide rail 15 and supports an electric motor 27. A pulley 28 is driven by the motor 27 and in turn drives a belt 29 which is trained about a pulley 30. The pulley 30 is fast on one end of a jack shaft 31 which is suitably mounted in bearings 32 secured to the side walls 11 and 12 of the trough. The opposite end of the jack shaft 31 has fixed thereto a sprocket 33 and the shaft 23 has fixed thereto a sprocket 34. A sprocket chain 35 is trained about the sprockets 33 and 34. An electric conductor 36 connects the motor 27 to a switch 37 which in turn is connected to a suitable source of electrical energy. The switch 37 is mounted upon the side wall 11 of the trough and the guide rail 15.

The trough is mounted for swinging movement in a vertical plane upon a pair of bars 38 and 39. The forward ends of the bars 38 and 39 are pivotally mounted as at 40 and 41 to straps 42 and 43, respectively, which are secured by welding or the like to the side wall 11 and the guide rail 15 and the side wall 12 and the guide rail 16, respectively. The opposite ends of the bars 38 and 39 are secured to an axle 44 on which are rotatably mounted tired wheels 45.

A pair of links 46 and 47 have their lower ends received between spaced apart apertured lugs 46a fixed to the axle 44. A pivot pin 47a extends through the apertured lugs 46a and the lower ends of the links 46 and 47 so that the links 46 and 47 are pivotally connected to the axle 44. The upper ends of the links 46 and 47 are pivotally supported by a rod 48. A second pair of links 49 and 50 have their lower ends pivoted upon the rod 48 and their upper ends pivotally mounted as at 49a upon plates 51 and 52, respectively. The plates 51 and 52 are secured as by welding or the like to the side wall 11 and the guide rail 15 and the side wall 12 and the guide rail 16, respectively. The links 49 and 50 are disposed inwardly of the links 46 and 47, respectively.

A cord 53 has one end secured to an anchor plate 54 which in turn is attached to the side wall 11 of the trough and the guide rail 15. The cord 53 is trained over a pulley 55, supported by a bracket 56, which in turn is carried by the rod 48 and the opposite end of the cord 53 is secured to a spool 57 about which the cord 53 is adapted to be wound. The spool 57 is fast on a shaft 58 which is rotatably supported by plates 59 and 60. The plates 59 and 60 are secured as by welding or the like to the side wall 11 of the trough and the guide rail 15 and the side wall 12 and the guide rail 16, respectively. A crank 61 is secured to the shaft 58 for rotating the spool 57 and winding the cord 53 thereon. A ratchet wheel 62 is fast on the shaft 58 and a cooperating dog 63 is pivotally mounted on a bar 64 which is secured to the side wall 11 of the trough and the guide rail 15.

For supporting the conveyor in its horizontal position shown in Figure 5, a stop frame member is provided comprising a pair of spaced apart uprights 65, the lower ends of which are secured to the axle 44 and their upper ends are connected by a cross bar 66. The uprights 65 are of angle iron construction and one flange of each is cut away for a distance of about one and one-half inches from the top and the other flange is bent at an angle of the order of forty-five degrees to provide supporting guides 65a. Intermediate their ends the uprights 65 are reinforced by a cross brace 67 which is secured to the inner opposed faces of the uprights 65. Braces 68 have their upper ends secured to the uprights 65 and their lower ends secured to the bars 38 and 39, respectively. Spacing sleeves 69 and 70 surround the rod 48 and are interposed between the links 46 and 49 and links 47 and 50, respectively. The rod 48 is received by openings in the links 46, 47, 49 and 50 which are approximately three inches from the adjacent ends of these links so that this arrangement, together with the spacing sleeves 69 and 70, will take the side play out of the conveyor when it is elevated to its operative position. A supporting foot 71 of angle iron formation in cross section is mounted upon the side walls 11 and 12 of the trough and extends downwardly below the guide rails 15 and 16 to engage the floor 72 of the chicken house.

In order to prevent the manure from sliding off the upper run of the conveyor belt 25, cleats 73 are mounted on the conveyor belt 25 at spaced apart intervals. A hitch 74 is welded to the side walls 11 and 12 of the trough for detachably connecting the conveyor to a truck or tractor when it is desired to move the device from one location to another.

The following means is provided for adjusting the tension of the conveyor belt 25. Brackets 78 in the form of angle irons have their vertical flanges welded to the side walls 11 and 12, respectively, and their horizontal flanges are slotted as at 79 to slidably receive bolts 80 and 81 which have enlarged heads 82 for engaging the walls of the slots for preventing the bolts escaping from the slots. The bolts 80 and 81 support the bearings 19 between lock nuts 80a and 81a from the brackets 78. An adjusting rod 83 extends through and is supported by the foot 71 and has its rear end portion connected as at 84 to the bolt 81 and its forward free end is threaded to receive a nut 85. Tightening of the nut 85 will cause the rod 83 to move forwardly and thereby increase the tension of the belt 25.

A scraper 86 in the form of a flat piece of iron about one and one-half inches by one-fourth inch is welded to the strap 17 and is disposed at an angle of the order of forty-five degrees to the guide rail 15. The scraper is disposed close to the belt 25 so that it will remove all material from the belt to prevent it reaching the drum 21. The rail 15 and the adjacent plate 87 are cut away to permit the scrapings to escape.

In the operation of the improved device when in substantially horizontal position as shown in Figure 5, it is ready for transportation from one location of operation to another by a truck or tractor. When the conveyor has been disconnected from the truck or the like it can be rolled on its wheels 45 over the ground 75 by the attendant so that the forward end of the conveyor is introduced into a chicken house 77 through its door until approximately eight to ten feet of the forward portion of the device is within the chicken house.

The attendant can then lower the forward end portion of the conveyor by turning the crank 61 in a clockwise direction looking at Figure 1. This action will wind the cable 53 around the spool 57, and through the rod 48 will cause the links 46, 47, 49 and 50 to approach a vertical position as shown in Figure 1 from the angular position shown in Figure 5. This movement of the links from the angular to the substantially vertical position will cause the rear end portion of the conveyor to swing about the pivot points 40 and 41 so that its rear end portion will be elevated and its forward end portion lowered until the supporting foot 71 engages the floor 72 of the chicken house.

When the desired elevation of the conveyor has been obtained the dog 63 will engage the teeth of the ratchet wheel 62 to prevent unwinding of the cord 53 so that the conveyor will be maintained against accidental displacement in its adjusted position. In this position the conveyor will be readily accessible for the attendant to shovel the manure from the floor 72 of the chicken house on to the forward end portion of the conveyor belt 25. The motor 27 can be started by means of the switch 37 and conveyor belt operated through the belt 29, pulley 30, sprockets 33 and 34 and sprocket chain 35.

After the chicken house has been cleared of the manure the locking dog 63 can be disengaged from the ratchet wheel 62 and the conveyor lowered to its horizontal position shown in Figure 5. When the conveyor is being moved to its horizontal position, the guide rails 15 and 16 will engage the guides 65a and be guided into proper position thereby. The conveyor will be restrained against lateral displacement by the engagement of the guide rails 15 and 16 with the guides 65a. The downward movement of the rear end portion of the conveyor is limited by the engagement of the guide rails 15 and 16 with the upper surface of the cross bar 66 of the stop member frame. While the device is inoperative and during transportation of it from one farm to another, the cross bar 66 will support the conveyor.

It will be noted from Figure 3 that the guide rails 15 and 16 will support the lower run of the conveyor belt 25 and the belt will be guided by these guide rails so that the cleats 73 will pass therebetween without interference. For the purpose of permitting sand to escape which would otherwise accumulate under the upper run of the conveyor belt 25, elongated slits 76 are provided in the bottom 10 of the trough adjacent each side wall 11 and 12. In order to prevent the manure from falling on the lower run of the belt 25 as it is shoveled from the floor to the upper run of the conveyor belt, plates 87 are secured by welding or the like to the side wall 11 of the trough and the guide rail 15 and the side wall 12 and the guide rail 16, respectively. The plates 87 are secured to the forward ends of the side walls 11 and 12 and extend rearwardly for approximately thirty-six inches.

It is obvious that various changes and modifications may be made in the details of construction and design of the above specifically described embodiment of this invention without departing from the spirit thereof, such changes and modifications being restricted only by the scope of the following claims.

What I claim is:

1. An improved light conveyor comprising an axle, a pair of wheels on said axle, a first pair of spaced bars rigidly secured at one end to said axle, a second pair of spaced bars rigidly secured at one end to said axle at an angle to said first pair of bars, an endless conveyor having sides, means for pivotally securing the outer ends of said first pair of bars to the sides of said conveyor, a first pair of spaced links pivotally secured at one end to said axle, a second pair of spaced links pivotally secured at one end to the opposite sides of said conveyor in spaced relation to the first pair of bars, a rod pivotally connecting the outer ends of the first and second pairs of links, a pulley connected to said rod, a drum rotatably mounted on said conveyor, a cord secured at one end to said conveyor, trained about said pulley and secured at its other end to said drum, means for rotating said drum to move said rod and said links to raise or lower one end of said conveyor, and means at the upper ends of said second pair of bars forming a rest for said conveyor.

2. An improved light conveyor comprising an axle, a pair of wheels on said axle, a pair of spaced bars rigidly secured at one end to said axle, an endless conveyor having sides, means for pivotally securing the outer ends of said pair of bars to the sides of said conveyor, a first pair of spaced parallel links pivotally secured at one end to said axle, a second pair of parallel links pivotally secured at one end to the opposite sides of said conveyor in spaced relation to the first pair of bars, a rod pivotally connecting the outer ends of the first and second pairs of links, a pulley connected to said rod, a drum rotatably mounted on said conveyor, a cord secured at one end to said conveyor, trained about said pulley and secured at its other end to said drum, means for rotating said drum to move said rod and said links to raise or lower one end of said conveyor, and a second pair of spaced bars rigidly secured at one end to said beam and projecting upwardly therefrom between the first named pair of bars and the first pair of links, and support means at the upper ends of said second pair of bars forming a rest for said conveyor when the conveyor is in its lowest position.

3. An improved light conveyor comprising an axle, a pair of wheels on said axle, a pair of relatively long spaced bars rigidly secured at one end to said axle, an endless conveyor having sides, means for pivotally securing the outer ends of said pair of bars to the sides of said conveyor adjacent one end thereof, a first pair of spaced links pivotally secured at one end to said axle, a second pair of links pivotally secured at one end to the opposite sides of said conveyor adjacent the other end of said conveyor, a pivot connecting the outer ends of the first and second pairs of links, a pulley connected to said links at said pivot, a drum rotatably mounted on said conveyor, a cord secured at one end to said conveyor, trained about said pulley and secured at its other end to said drum, means for rotating said drum to move said rod and said links to raise or lower said other end of said conveyor, a second pair of spaced bars substantially shorter than the first named pair of bars rigidly secured to said beam and projecting upwardly therefrom between the first named pair of bars and the first pair of links, and means on said second pair of bars forming a rest for said conveyor when said conveyor is in its lowest position.

4. An improved conveyor comprising an axle, a pair of wheels on said axle, a pair of relatively long, spaced bars, rigidly secured at one end to said axle, a conveyor frame having vertical spaced sides, pivot means connecting the outer ends of said bars to the sides of the frame adjacent the front end thereof, an endless belt carried by said frame between said sides, guide rails extending inward from the bottom of said sides for supporting the bottom run of said belt, a motor mounted beneath said frame adjacent the rear end thereof, a driving connection between said motor and said belt, a second pair of bars rigidly secured at one end to said axle and projecting upwardly therefrom, means at the upper ends of said second pair of bars forming a rest for said frame, a first pair of spaced links pivotally connected to said axle, a second pair of spaced links pivotally connected to the sides of said frame, pivot means connecting the outer ends of said links, the combined length of said links being substantially greater than the length of said second pair of bars, a drum rotatably mounted on said frame, cord secured at one end to said drum, means operatively connecting said cord to the links adjacent the pivotal connections between said links, means for rotating the drum to actuate said links to raise or lower the rear end of said conveyor and a lock for holding said drum in selected position.

GEORGE A. NEWELL.

REFERENCES CITED

The following references are of record in the file of this patent:

UNITED STATES PATENTS

| Number | Name | Date |
|---|---|---|
| 389,538 | Baker | Sept. 18, 1888 |
| 455,355 | Pitts | July 7, 1891 |
| 676,504 | Kassel | June 18, 1901 |
| 987,809 | McCray | Mar. 28, 1911 |
| 1,558,300 | Searles | Oct. 20, 1925 |
| 1,800,428 | Bebinger et al. | Apr. 14, 1931 |
| 1,933,485 | Rund et al. | Oct. 31, 1933 |
| 1,989,537 | Wentz | Jan. 29, 1935 |
| 2,320,667 | Smith | June 1, 1943 |
| 2,343,133 | Blank | Feb. 29, 1944 |

FOREIGN PATENTS

| Number | Country | Date |
|---|---|---|
| 468,006 | Germany | Nov. 28, 1928 |